US009650917B2

(12) United States Patent
Stewart et al.

(10) Patent No.: US 9,650,917 B2
(45) Date of Patent: May 16, 2017

(54) NACELLE WITH HINGED COWL DOORS ENABLING ACCESS TO THE ENGINE

(75) Inventors: Timothy Stewart, Antrim (GB); Alan Tweedie, Holywood (GB); Michael Hatrick, Werum (SE)

(73) Assignee: SHORT BROTHERS PLC, Belfast (IE)

( * ) Notice: Subject to any disclaimer, the term of this patent is extended or adjusted under 35 U.S.C. 154(b) by 1072 days.

(21) Appl. No.: 13/825,958

(22) PCT Filed: Sep. 24, 2010

(86) PCT No.: PCT/EP2010/064197
§ 371 (c)(1),
(2), (4) Date: Jun. 5, 2013

(87) PCT Pub. No.: WO2012/037988
PCT Pub. Date: Mar. 29, 2012

(65) Prior Publication Data
US 2013/0259641 A1  Oct. 3, 2013

(51) Int. Cl.
*F01D 25/24* (2006.01)
*B64D 29/08* (2006.01)

(52) U.S. Cl.
CPC .............. *F01D 25/24* (2013.01); *B64D 29/08* (2013.01)

(58) Field of Classification Search
CPC ........ B64D 29/06; B64D 29/08; B64D 29/00; F05D 2240/14
See application file for complete search history.

(56) References Cited

U.S. PATENT DOCUMENTS

| 4,585,189 A | 4/1986 | Buxton | |
| 4,679,750 A * | 7/1987 | Burhans | B64D 29/06 244/129.4 |
| 4,683,717 A * | 8/1987 | Naud | B64D 29/08 60/226.1 |
| 5,046,689 A * | 9/1991 | Shine | B64D 29/08 244/129.4 |
| 5,157,915 A | 10/1992 | Bart | |
| 5,350,136 A | 9/1994 | Prosser et al. | |
| 5,737,914 A | 4/1998 | Porte et al. | |

(Continued)

FOREIGN PATENT DOCUMENTS

EP  0132214  1/1985
EP  0155887 A1  9/1985
(Continued)

OTHER PUBLICATIONS

International Search Report and Written Opinion mailed Aug. 25, 2011, in International Patent Application No. PCT/EP2010/064197.
(Continued)

*Primary Examiner* — Gregory Anderson
*Assistant Examiner* — Michael Sehn
(74) *Attorney, Agent, or Firm* — Karceski IP Law, PLLC

(57) ABSTRACT

A nacelle for an engine has outer and inner cowl doors that are independently rotatable about offset hinge lines. A connection device is provided for selectively connecting the outer and inner cowl doors so as to cause them to open simultaneously. The inner cowl door is arranged to rotate by a greater angle than the outer cowl door so as to improve access to the engine for maintenance purposes.

30 Claims, 12 Drawing Sheets

(56) References Cited

U.S. PATENT DOCUMENTS

| | | | |
|---|---|---|---|
| 5,941,061 A | 8/1999 | Sherry et al. | |
| 6,227,485 B1 * | 5/2001 | Porte | B64D 29/08 244/53 B |
| 6,622,963 B1 | 9/2003 | Ahrendt et al. | |
| 7,083,144 B2 | 8/2006 | Howe et al. | |

FOREIGN PATENT DOCUMENTS

| | | |
|---|---|---|
| EP | 0393259 A1 | 10/1990 |
| EP | 1099629 A1 | 5/2001 |
| FR | 2897339 | 8/2007 |
| FR | 2907759 A1 | 5/2008 |
| FR | 2920177 | 2/2009 |

OTHER PUBLICATIONS

United Kingdom Combined Search and Examination Report dated Jan. 25, 2011, for United Kingdom Patent Application No. GB 1016085.1.

* cited by examiner

Section A-A

Section B-B

NACELLE WITH HINGED COWL DOORS ENABLING ACCESS TO THE ENGINE

CROSS-REFERENCE TO RELATED APPLICATION(S)

This is a National Stage Entry into the United States Patent and Trademark Office from International PCT Patent Application No. PCT/EP2010/064197, having an international filing date of 24 Sep. 2010, the contents of which are incorporated herein by reference.

FIELD OF THE INVENTION

The present invention relates to a nacelle and particularly, but not exclusively, to a nacelle for a turbine engine such as a turbofan engine for an aircraft. Aspects of the invention relate to a nacelle, to a thrust-reverser section for a nacelle, to an engine, to an aircraft or vehicle and to a method.

BACKGROUND OF THE INVENTION

Gas turbine engines, in particular so-called turbofan engines, are commonly used to provide propulsion for a wide range of modern aircraft. Such engines typically include a bypass duct through which a proportion of the air pressurized by the fan is passed and a fan nozzle for producing thrust from the fan-pressurized bypass air. The remaining air is passed through the engine core in which it is used as the working fluid to generate power for the fan.

Such engines are typically supported within a nacelle that is secured to the structure of the aircraft, for example to the fuselage or to the underside of the wing, by means of a pylon. The nacelle typically comprises an outer cowl, defining the external housing of the engine and within which the fan is disposed, and an inner cowl which houses the core of the engine, i.e. the turbine and combustion chamber stages of the engine. The inner and outer cowls are generally cylindrical in section and are aligned substantially concentrically and generally parallel with the main or thrust axis of the engine. The bypass duct is defined by the generally annular space between the radially inner and outer cowls and includes a fan nozzle at its exit.

In many turbofan engines, the outer cowl includes a thrust-reverser section located towards the rear of the nacelle. In such arrangements, the rear section of the outer cowl is moveable, for example translatable, relative to the forward section of the outer cowl so as to enable the deployment of blocking devices which cause the pressurised air from the fan to be diverted forwardly and impart a retardation force on the aircraft during braking.

In order to facilitate access to the engine by maintenance personnel, in some turbofan engines the thrust-reverser section of the cowl is divided into two halves known as C-ducts each of which is hinged to the pylon at its upper edge for rotation about a thrust-reverser hinge-line extending generally parallel to the main axis of the engine. Rotation of these C-ducts (which effectively constitute a pair of clamshell-type outer cowl doors and are therefore hereafter termed thrust-reverser cowl doors) about the thrust-reverser hinge-line affords access to the components of the engine by maintenance operators.

In such engines, it is common for the section of the inner cowl corresponding to the thrust-reverser section also to be divided into two halves (hereafter termed core cowl doors) with each half being fixed to, or integrally formed with, the corresponding thrust-reverser cowl door. The space between the core cowl door and the corresponding thrust-reverser cowl door defines a portion of the bypass duct as described above.

In use, during inspection or maintenance of the engine, the thrust-reverser cowl doors are opened by rotation either manually or hydraulically by means of a power door opening system (PDOS). Rotation of the thrust-reverser cowl doors about the thrust-reverser hinge-line causes corresponding rotation of the core cowl doors, which are connected thereto, so as to provide access to the engine core components.

However, the applicant has recognised that, in cases where the engine is suspended by a pylon below the wing of an aircraft such that the thrust-reverser section is disposed beneath the leading edge of the wing, the amount of rotation, i.e. the degree of opening, of the thrust-reverser cowl doors is generally limited by their clearance to the lower surface of the wing. Since the inner cowl doors are fixed to the thrust-reverser cowl doors and are therefore not independently moveable relative thereto, the degree of opening of the inner cowl doors is similarly limited. Thus, overall accessibility of the engine core for maintenance purposes is restricted.

Modifying the shape or configuration of the nacelle or wing in order to improve clearance between the thrust-reverser cowl doors and the underside of the wing may result in sub-optimal aerodynamic characteristics. On the other hand, lengthening the pylon in order to increase the distance between the engine and the underside of the wing positions the engine closer to the ground, increasing the risk of damage to the engine by ingestion of debris. Finally, complete removal of the cowl doors may improve access to the engine core, but significantly increases maintenance operator time and costs.

There is therefore a need to improve the degree of access to the engine core when the inner and outer cowl doors are opened whilst obviating the inherent disadvantages of the above-mentioned solutions. It is an aim of the present invention to address this problem. Embodiments of the invention may improve maintenance access to the core of a turbofan engine by providing a nacelle for an engine comprising independently rotatable inner and outer cowl doors which can be selectively connected to rotate about different hinge lines. Other aims and advantages of the invention will become apparent from the following description, claims and drawings.

SUMMARY OF THE INVENTION

Aspects of the invention provide a nacelle, a thrust-reverser section for a nacelle, an engine, an aircraft and a method as claimed in the appended claims.

According to another aspect of the invention for which protection is sought, there is provided a nacelle for an engine, comprising at least one outer cowl door, at least one inner cowl door and connection means for selectively connecting the outer cowl door to the inner cowl door.

The connection means may comprise a connection device such as a rod, strut, bar or linkage.

In an embodiment, the outer and inner cowl doors are hinged to the nacelle, or to a pylon on which the nacelle is mounted, for independent rotation relative thereto.

In an embodiment, the outer cowl door is hinged for rotation about a first hinge line or axis and the inner cowl door is hinged for rotation about a second hinge line or axis, the first and second hinge lines or axes being offset from each other. The second hinge line or axis may be radially and/or laterally offset from the first hinge line or axis. Advantageously, the second hinge line or axis is disposed radially inwardly of the first hinge line or axis.

The first hinge line or axis may be substantially parallel to the second hinge line or axis. For example, in an embodiment, the first and second hinge lines or axes are substantially parallel to a central axis of the nacelle. Alternatively, the first and second hinge lines or axes may be mutually non-parallel, with only one or neither being parallel to the central axis of the nacelle.

The outer and inner cowl doors may be independently movable between closed and respective fully open positions. In one embodiment, the perpendicular distance between the cowl doors in the fully open position thereof is less than the perpendicular distance between the cowl doors in the closed position thereof. Alternatively, or in addition, the angle through which the inner cowl door rotates between the closed and fully open positions thereof may be greater than the angle through which the outer cowl door rotates between the closed and fully open positions thereof.

In an embodiment, in the fully open position of the outer and inner cowl doors, the inner cowl door is at least partially nested within the outer cowl door. Advantageously, the connection device may be arranged to maintain the inner cowl door at least partially nested within the outer cowl door when the cowl doors are in the fully open position.

In one embodiment the connection device has a fixed length. In another embodiment, the connection device is variable in length. For example, the connection device may be extensible and movable between a first, reduced length, position and a second, extended length, position.

In an embodiment, the connection device is arranged to connect the inner cowl door to the outer cowl door such that movement of the connection device between the second position and the first position permits the inner cowl door to rotate through a greater angle than the outer cowl door. For example, the inner cowl door may move relative to the outer cowl door such that the perpendicular distance between the cowl doors reduces.

Advantageously, the connection device may be arranged for connection between the outer and inner cowl doors prior to commencement of opening, thereby to permit the outer and inner cowl doors to open simultaneously.

In an embodiment, the connection device is arranged to be selectively locked in at least one of the first and second positions. Alternatively, or in addition, the connection device may be arranged to be selectively locked in one or more positions between the first and second positions.

In an embodiment, the connection device is pivotally connectable and/or connected at each end thereof to a respective one of the inner and outer cowl doors. For example, a first end of the connection device may be connectable to one of the inner and outer cowl doors by means of a first articulation while a second end of the connection device may be connectable to the other of the inner and outer cowl doors by means of a second articulation.

In an embodiment, the first end of the connection device is fixed to one of the inner and outer cowl doors by means of the first articulation and the second end of the connection device is detachably connectable to the other of the inner and outer cowl doors by means of an articulated attachment device. The first and/or second articulation may comprise one of a ball joint, rose joint or universal joint.

In an embodiment, when the connection device connects the inner and outer cowl doors, the arrangement effectively defines an articulated, four-bar linkage. The linkages of the four-bar linkage comprise the cowl doors, the connection device and a portion of the nacelle while the pivots of the four-bar linkage comprise the first and second hinge lines, and the articulations at either end of the connection device.

In an embodiment, the inner cowl door comprises a portion of a core cowl for at least partially surrounding a core of an engine housed in the nacelle. In an embodiment, the outer cowl door comprises a thrust-reverser portion of the nacelle.

The connection device may be movable between a stowed position and a deployed position in which the connection device connects the outer and inner cowl doors. In an embodiment, the connection device is biased towards one of the first and second positions.

The nacelle may comprise at least one of a first latch for latching the outer cowl door to a second, opposing outer cowl door in the closed position thereof and a second latch for latching the inner cowl door to a second, opposing inner cowl door in the closed position thereof.

According to a further aspect of the invention for which protection is sought, there is provided a thrust-reverser section for an engine nacelle, comprising an outer cowl door an inner cowl door and a connection device for selectively connecting the outer and inner cowl doors.

According to a still further aspect of the invention for which protection is sought, there is provided a method of accessing an engine housed in a nacelle having outer and inner cowl doors, the method comprising opening at least one outer cowl door by rotation through a first angle of rotation, opening at least one inner cowl door by rotation through a second angle of rotation, that is greater than the first angle of rotation and connecting the at least one outer cowl door to the at least one inner cowl door.

Advantageously, by rotating the inner cowl door through a greater angle than the outer cowl door, improved accessibility to the engine is provided.

The steps of the method may be carried out sequentially and in the order listed. The method may additionally comprise rotating the at least one outer cowl door and the at least one inner cowl door simultaneously.

Alternatively, the steps of the method may be carried out in a different order or may be carried out simultaneously. For example, the method may comprise connecting the at least one outer cowl door to the at least one inner cowl door and then opening the cowl doors simultaneously.

In another embodiment, the method comprises carrying out the opening and connecting steps simultaneously.

In an embodiment, opening the at least one outer cowl door comprises rotating the at least one outer cowl door about a first hinge line or axis and wherein opening the at least one inner cowl door comprises rotating the at least one inner cowl door about a second hinge line or axis, the first and second hinge lines or axes being offset from each other.

In another embodiment, the method comprises unlatching the outer cowl door and rotating it through a first angle to a partially open position, unlatching the inner cowl door and coupling a connection device between the inner cowl door and the outer cowl door, opening the inner cowl door by rotation through a second angle that is greater than the first angle and rotating the outer cowl door to a fully open position whereby the connection device couples the movement of the outer cowl door with the inner cowl door, causing the cowl doors to open simultaneously.

According to another aspect of the invention for which protection is sought, there is provided a nacelle for an engine comprising an outer cowl door, an inner cowl door at least partly overlapped by the outer cowl door and at least one link rod, wherein the inner cowl door and the outer cowl door are independently pivotable between closed and open positions, and wherein the link rod is arranged to selectively join the inner cowl door to the outer cowl door such that when the two doors are thus joined, the cowl doors may be opened simultaneously.

Advantageously, pivotally securing the inner cowl door to the nacelle independently from the outer cowl door allows the inner cowl door to open wider than would be the case if the cowl doors were integrally formed. This facilitates greater access to the engine by maintenance personnel.

In addition, the present invention provides the advantage that the link rods may selectively join the inner and outer door together, so permitting simultaneous operation of the doors where required. This provides the maintenance personnel with the option to use the doors independently if required.

According to yet another aspect of the invention for which protection is sought, there is provided a nacelle for an engine comprising a hinged outer cowl door at least partially overlapping a hinged inner cowl door, wherein the inner cowl door is arranged to at least partially nest or tessellate within the outer cowl door when in the open position.

The various aspects and embodiments of the invention greatly increases the available access provided to the engine with the cowl doors open, reducing the time and attendant cost of regular scheduled engine maintenance.

Within the scope of this application it is envisaged that the various aspects, embodiments, examples, features and alternatives set out in the preceding paragraphs, in the claims and/or in the following description and drawings may be taken independently or in any combination thereof. In particular, features described in connection with one embodiment are applicable to the other embodiment, except where there is an incompatibility of features.

BRIEF DESCRIPTION OF THE DRAWINGS

The present invention will now be described, by way of example only, with reference to the accompanying drawings in which.

DETAILED DESCRIPTION

Figure 1:
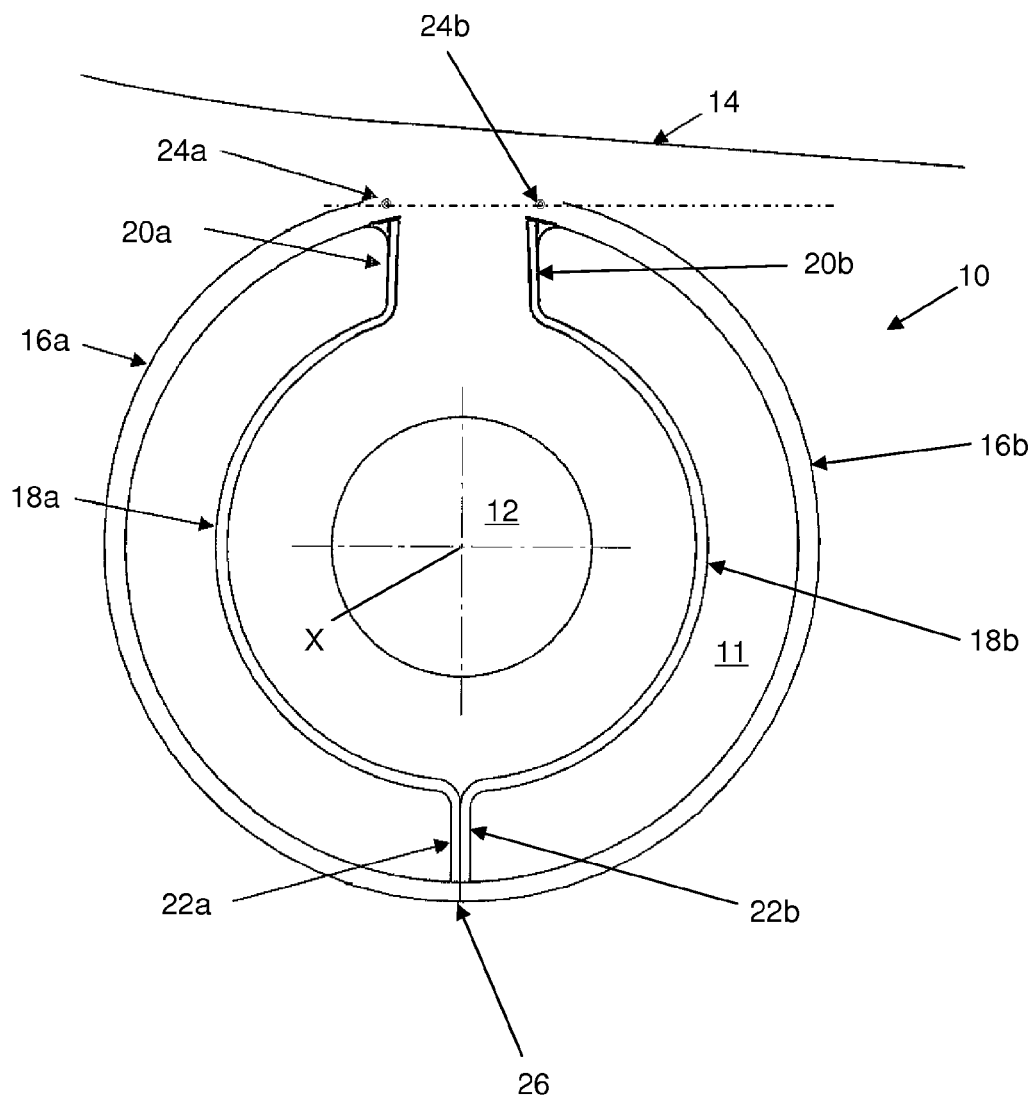
FIG. 1 shows a section through a known C-duct type engine nacelle shown with closed outer and inner cowl doors.

As far as possible, in the following description, like reference numerals indicate like parts.

Figure 2:
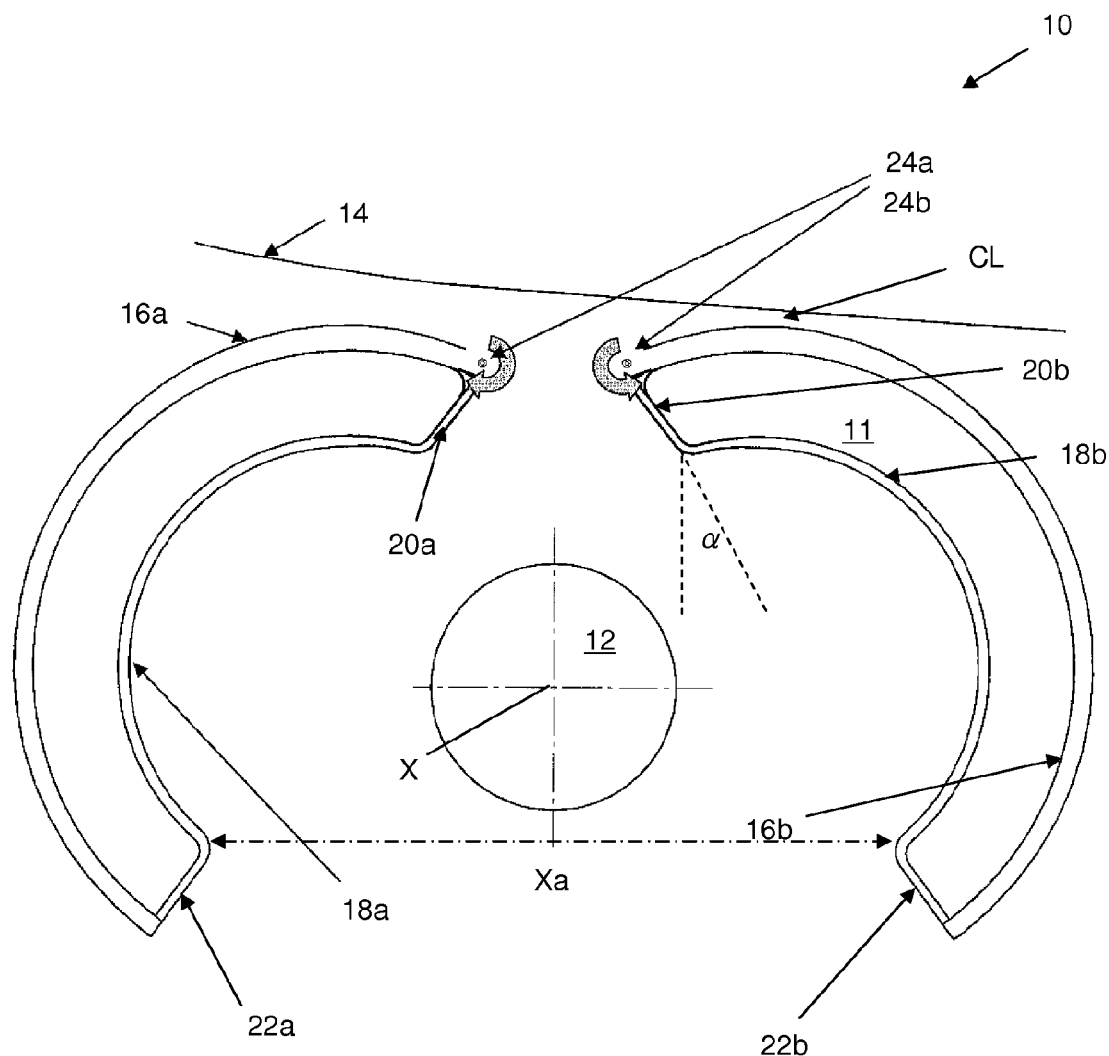
FIG. 2 shows the engine nacelle of FIG. 1 with outer and inner cowl doors in a fully open position.

FIGS. 1 and 2 show section views through a C-duct type thrust-reverser section of a known form of engine nacelle 10.

Referring firstly to FIG. 1, the nacelle 10 houses a turbofan engine consisting of a ducted fan (not shown) and an engine core shown schematically at 12. The engine core 12 is mounted within the nacelle 10 substantially coaxially with the fan and includes, for example, a multistage turbine arrangement, a combustion chamber and an exhaust nozzle, none of which are illustrated. In the illustrated example, the nacelle 10 is mounted to the underside of the wing 14 of an aircraft by means of a pylon (not shown).

The thrust-reverser section of the nacelle 10 includes an outer cowl, comprising a pair of semicircular or C-shaped thrust-reverser cowl doors 16a, 16b, and an inner or core cowl, comprising a correspondingly-shaped pair of core cowl doors 18a, 18b which have a smaller radius than the thrust-reverser cowl doors 16a, 16b and which house a rearward portion of the engine core.

The left hand core cowl door 18a is fixed to, or integral with, the left hand thrust-reverser cowl door 16a and is joined to upper and lower portions thereof by integral upper and lower bifurcations 20a, 22a. Similarly, the right hand core cowl door 18b is fixed to, or integral with, the right hand thrust-reverser cowl door 16b and is joined to upper and lower portions thereof by integral upper and lower bifurcations 20b, 22b. The spaces 11 defined between the each thrust-reverser cowl door 16a, 16b and the corresponding core cowl door 18a, 18b together form an annular channel forming part of the bypass duct for the nacelle 10.

The left hand pair of doors, comprising the left hand thrust-reverser cowl door 16a and the left hand core cowl door 18a joined thereto, is hinged or otherwise pivotally connected at its upper edge to an upper part of the nacelle 10, or to the pylon (not shown), for rotation about a common left-hand thrust-reverser hinge line 24a. Likewise, the right hand pair of doors, comprising the right hand thrust-reverser cowl door 16b and the right hand core cowl door 18b joined thereto, is hinged or otherwise pivotally connected at its upper edge to the upper part of the nacelle 10, or to the pylon (not shown), for rotation about a common right-hand thrust-reverser hinge line 24b.

The left and right hand pairs of doors 16a, 18a, 16b, 18b are coupled at their lower interface 26 by a latch (not shown) which, when released, allows each pair of doors to be independently rotated upwardly about the respective thrust-reverser hinge line 24a, 24b so as to permit access to the engine core for maintenance purposes, as illustrated in FIG. 2.

The applicant has, however, recognised a disadvantage of the type of arrangement shown in FIGS. 1 and 2. In particular, in a case where the engine is mounted beneath the wing 14 of an aircraft, the available clearance between the nacelle 10 and the lower surface of the wing 14 limits the angle by which the thrust-reverser doors 16a, 16b can be rotated without contacting the wing 14.

This condition is best shown in FIG. 2, which illustrates the maximum angle of rotation α of the thrust-reverser doors 16a, 16b that can be achieved at the fully open position without direct contact occurring between the outer surface of the doors and the lower surface of the wing 14. In practice, due to the dihedral angle of the wing's lower surface and the curvature of the thrust-reverser cowl doors 16a, 16b, the maximum angle of rotation α of the cowl doors may be limited to less than 30° in order to maintain a predetermined minimum clearance CL between the door and the wing when in the fully open position.

Since the core cowl doors 18a, 18b are fixed to the thrust-reverser cowl doors 16a, 16b, there is no relative movement therebetween and their angle of rotation is thus similarly restricted. That is to say, the degree of opening of the core cowl doors 18a, 18b is limited to the maximum angle of rotation α of the thrust-reverser cowl doors 16a, 16b.

Furthermore, since the core cowl doors 18a, 18b are of smaller radius than the thrust-reverser cowl doors 16a, 16b, their maximum angle of rotation directly determines the accessibility afforded to maintenance personnel to the engine core 12 when the cowl doors are in the fully open position. In FIG. 2, this accessibility is represented by the opening dimension Xa.

Referring next to FIG. 3, the thrust-reverser section of a nacelle embodying one form of the invention is shown, in cross-section, generally at 30. The present invention has been conceived to address the above-mentioned problems associated with the type of nacelle described with reference to FIGS. 1 and 2, and to improve the accessibility to the engine core 12 during maintenance.

As with the nacelle shown in FIG. 1, the thrust-reverser section of the nacelle 30 includes an outer cowl, comprising a pair of semicircular or C-shaped thrust-reverser cowl doors 16a, 16b, and an inner or core cowl, comprising a correspondingly-shaped pair of core cowl doors 18a, 18b which have a smaller radius than the thrust-reverser cowl doors 16a, 16b and which house a rearward portion of the engine core 12.

The left and right hand thrust-reverser cowl doors 16a, 16b are each hinged or otherwise pivotally connected at their respective upper edges to a supporting body such as an upper part of the nacelle 30 or to the pylon (not shown) for rotation about a respective thrust-reverser hinge line 24a, 24b. Independently from the thrust-reverser cowl doors 16a, 16b, the core cowl doors 18a, 18b are each hinged or otherwise pivotally connected at their respective edges to a lower portion of a support part for rotation about a respective core cowl hinge line 32a, 32b. In the illustrated embodiment, the support part takes the form of a respective apron or bifurcation 20a, 20b fixed to, and extending downwardly from, the upper part of the nacelle 30 or the pylon.

It can be seen from FIG. 3, that the core cowl hinge lines 32a, 32b are offset radially from the corresponding thrust-reverser hinge lines 24a, 24b. In particular, the core cowl hinge line 32a for the left hand core cowl door 18a is radially inwardly displaced from the thrust-reverser hinge line 24a whilst the core cowl hinge 32b for the right hand core cowl door 18b is radially inwardly displaced from the thrust-reverser hinge line 24b.

In addition, in the illustrated embodiment, the core cowl hinge lines 32a, 32b are laterally and/or angularly displaced from the corresponding thrust-reverser hinge lines 24a, 24b. That is to say, the left hand core cowl hinge line 32a is angularly offset (in an anticlockwise direction in the drawing) and/or laterally displaced from the centerline X of the engine by a greater amount than the left hand thrust-reverser hinge line 24a. Similarly, the right hand core cowl hinge line 32b is angularly offset (in a clockwise direction in the drawing) and/or laterally displaced from the centerline X of the engine by a greater amount than the right hand thrust-reverser hinge line 24b.

Figure 11:
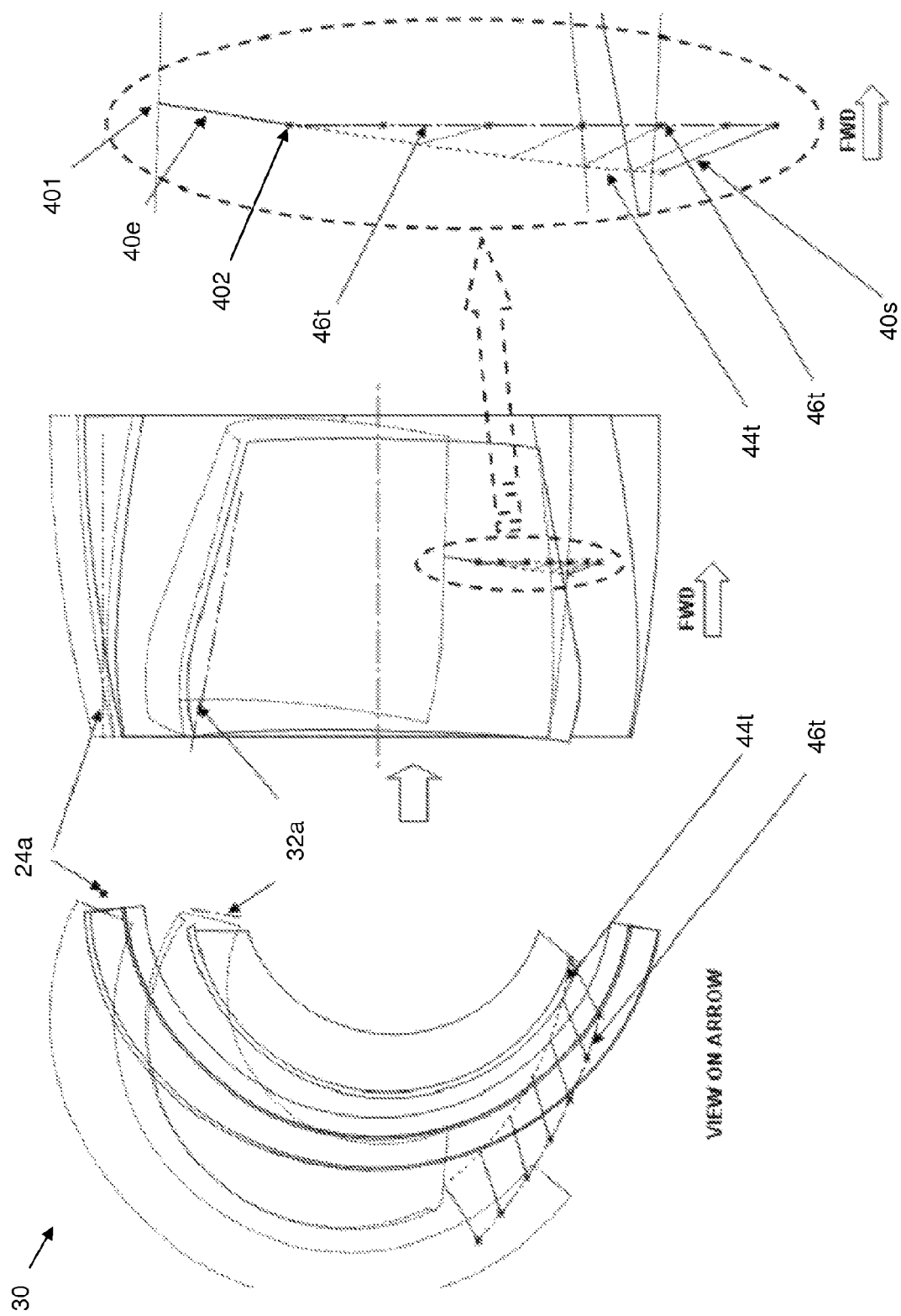
FIG. 11 illustrates the trajectory taken by the connecting device during opening of the cowl doors.

Furthermore, as best shown in FIG. 11, while the left and right hand thrust-reverser hinge lines 24a, 24b extend generally parallel to the engine centerline X, the left and right core cowl hinge lines 32a, 32b do not.

The illustrated arrangement is, however, not intended to be limiting and the invention is equally applicable to arrangements having substantially any orientation of hinge lines including, for example, arrangements in which the core cowl hinge lines 32a, 32b extend parallel to the corresponding thrust-reverser hinge lines 24a, 24b and/or to the engine centerline X, arrangements in which the core cowl hinge lines 32a, 32b are not angularly or laterally offset from the thrust-reverser hinge lines 24a, 24b and arrangements in which the thrust reverser hinge lines 24a, 24b and/or core cowl hinge lines 32a, 32b are not mutually parallel.

Again, the space 11 defined between each thrust-reverser cowl door 16a, 16b and the corresponding core cowl door 18a, 18b together form a generally annular channel comprising part of the bypass duct for the nacelle 30.

The left and right hand thrust-reverser cowl doors 16a, 16b are coupled at their lower interface 26 by a first latch (not shown) which, when released, permits each door to be rotated upwardly about its respective thrust-reverser hinge line 24a, 24b so as to permit access to the engine core cowl for maintenance purposes.

In addition, the left and right core cowl doors 18a, 18b are coupled at their lower interface 34 by a second latch (not shown) which, when released, permits each door to be rotated upwardly about its respective core cowl hinge line 32a, 32b so as to permit access to the engine core.

For the avoidance of doubt, the thrust-reverser section of the nacelle 30 differs from that of the nacelle 10 in that the core cowl doors 18a, 18b are not directly fixed to, or integral with, the thrust-reverser cowl doors 16a, 16b but, instead, are independently hinged to the nacelle 30 or to the pylon about respective core cowl hinge lines 32a, 32b that are radially and/or laterally offset from the thrust-reverser hinge lines 24a, 24b.

Figure 3A:
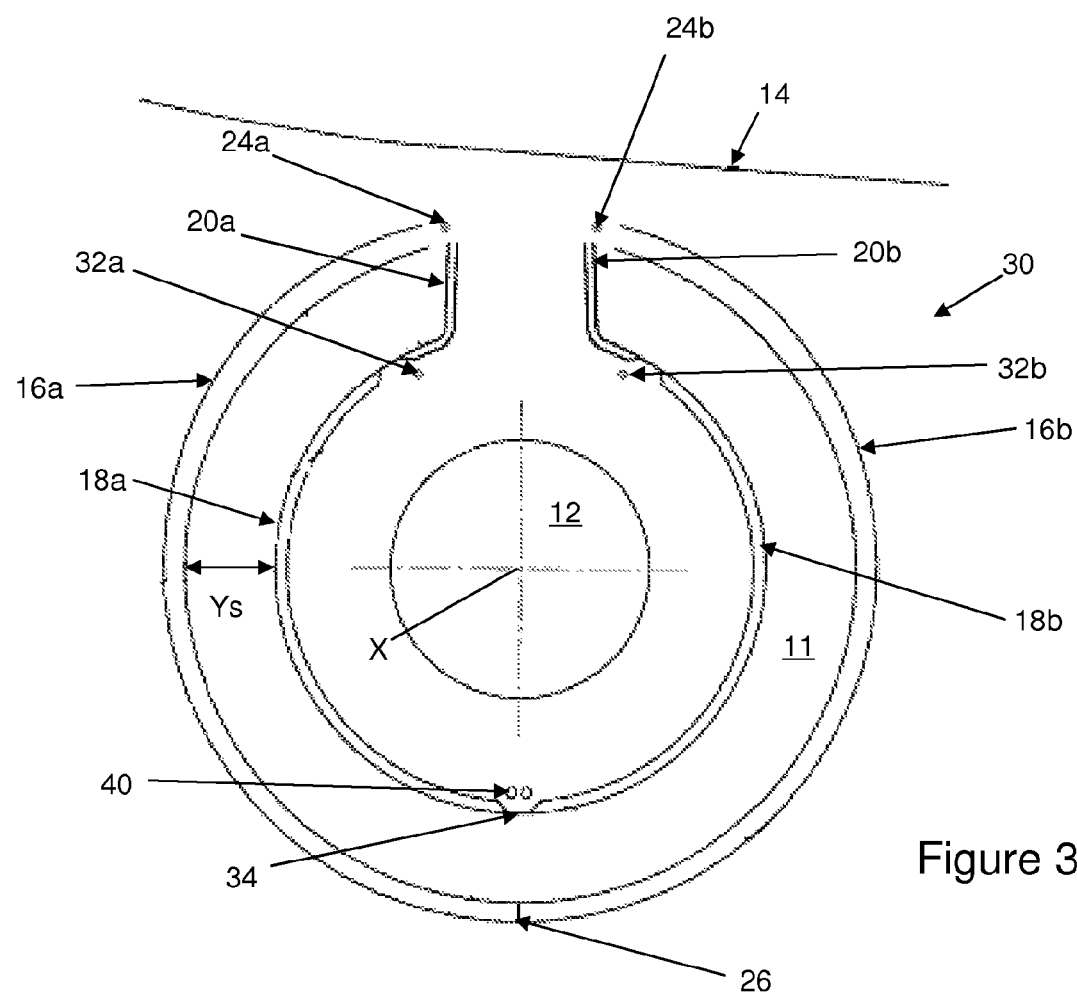
FIG. 3a shows a section through a form of engine nacelle embodying the present invention with closed outer and inner cowl doors.
Figure 3B:
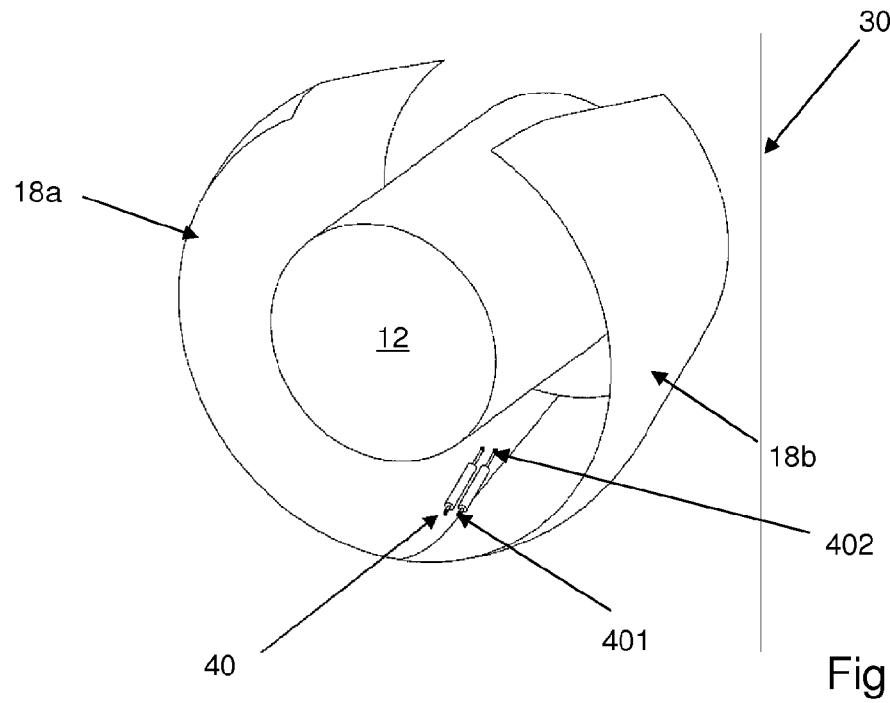
FIG. 3b illustrates the inner cowl doors of the nacelle of FIG. 3a in a perspective view.

In addition, as best shown in FIG. 3b, the nacelle 30 of the present invention is provided with connecting means in the form of a pair of elongate rods or struts 40 (hereafter termed link rods) for selectively connecting the left and right hand core cowl doors 18a, 18b to the corresponding thrust-reverser cowl doors 16a, 16b, as described below. In the illustrated embodiment, a first end 401 of each link rod 40 is pivotally connected to an inner surface of a respective one of the core cowl doors 18a, 18b by means of an articulation, such as a hinge or ball joint.

The second end 402 of each link rod includes an attachment means configured to connect to or engage with, preferably in an articulated manner, a suitably configured feature or attachment point (not shown) disposed on an inner surface of a respective one of the thrust-reverser cowl doors 16a, 16b.

In the illustrated embodiment, each link rod 40 is extensible, that is to say capable of adopting a plurality of axial lengths. For example, the link rod may be arranged to extend between a first, reduced length position, and a second, extended length position. Preferably, but not essentially, the link rod 40 is configured to be lockable in one or both of the first and second positions.

The use of variable-length link rods 40 is not essential (i.e. fixed-length link rods may alternatively be employed) but advantageously enables dimensional tolerances between the inner and outer cowl doors to be absorbed as well as providing further improved access for the maintenance operator, as described below.

FIGS. 3a and 3b illustrate the nacelle 30 in a closed condition. In the closed condition of the nacelle 30, the link rods 40 are placed in a stowed position in which each link rod is fully retracted and lies adjacent the inner surface of the respective core cowl door 18a, 18b, extending generally parallel to the centerline X of the engine on either side of the lower interface 34 between the left and right hand core cowl doors 18a, 18b. As described above, the first end 401 of each link rod 40 is permanently fixed to the core cowl door inner surface by means of the articulation. On the other hand, the second, free end 402 of each link rod 40 is releasably connected to the respective core cowl door 18a, 18b by the attachment means. This arrangement reduces any adverse effect on the fluid flow through the engine caused by the presence of the link rods 40.

Referring now to FIGS. 4 and 5, these illustrate an opening sequence for the thrust-reverser section of the nacelle 30 which may be used, for example, during maintenance of the engine.

Figure 4A:
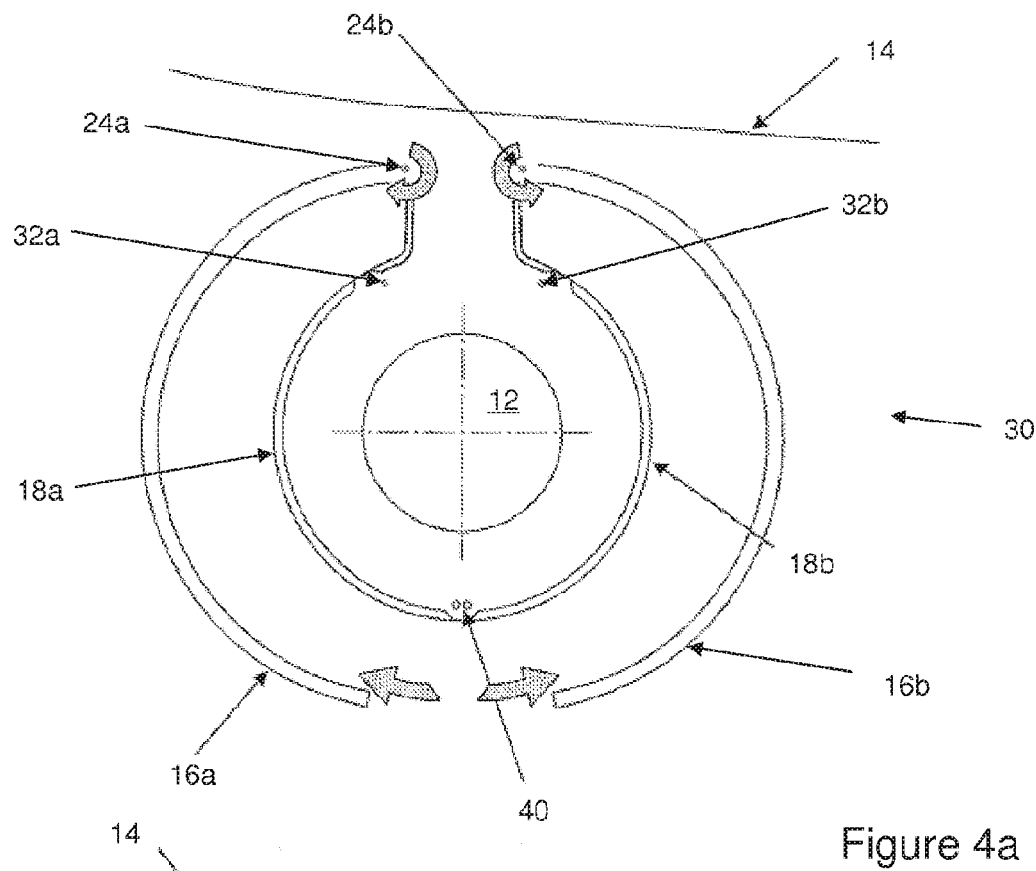
FIG. 4a illustrates a first opening step for the nacelle of FIG. 3a in which the outer cowl doors are opened to a first position and the inner cowl doors remain closed.

In a first step, shown in FIG. 4a, the first latch (coupling the left and right hand thrust-reverser cowl doors 16a, 16b at their lower interface 26) is released by the maintenance operator and the thrust-reverser cowl doors 16a, 16b are each rotated, together or independently, about their respective thrust-reverser hinge line 24a, 24b to a first, partially open position. This initial opening of the thrust-reverser cowl doors 16a, 16b may be carried out manually or, advantageously, by means of a powered door opening system (PDOS) which may comprise an electrical or hydraulic actuator system.

The amount by which the thrust-reverser cowl doors 16a, 16b are initially opened may be selected as desired but should be sufficient for the maintenance operator to gain access to the second latch (coupling the left and right hand core cowl doors 18a, 18b) and the stowed maintenance rods 40.

Figure 4B:
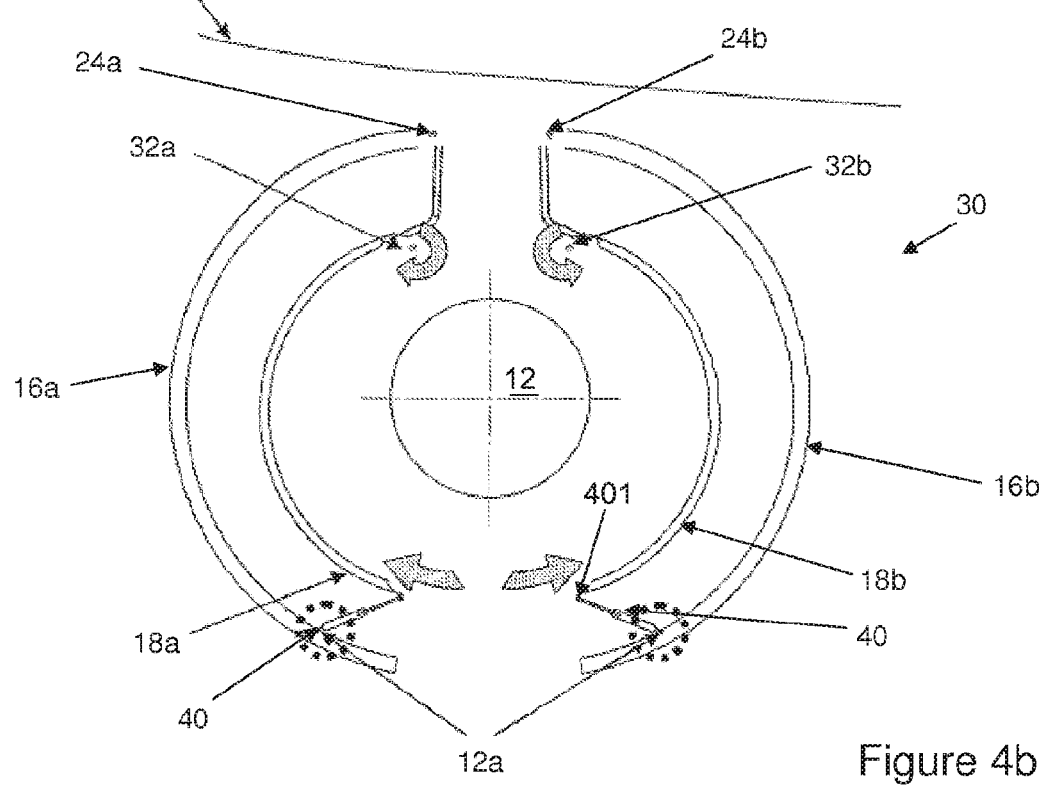
FIG. 4b illustrates a second opening step for the nacelle of FIG. 3a in which connecting devices are deployed to join the inner and outer cowl doors.

In a second step, shown in FIG. 4b, once the left and right thrust-reverser cowl doors 16a, 16b are in the partially open position as described above, the maintenance operator releases the second latch so as to uncouple the left and right core cowl doors 18a, 18b. The operator then releases the link rods 40 from their stowed position and attaches the second end 402 of each link rod to the attachment point (not shown) on the inner surface of the respective thrust-reverser cowl door 16a, 16b. Advantageously, the link rods 40 are configured such that they are substantially fully extended when initially coupled to the attachment point. The left and right core cowl doors 18a, 18b are thus coupled in an articulated manner to the corresponding thrust-reverser cowl door 16a, 16b by means of the link rods 40.

Figure 5A:
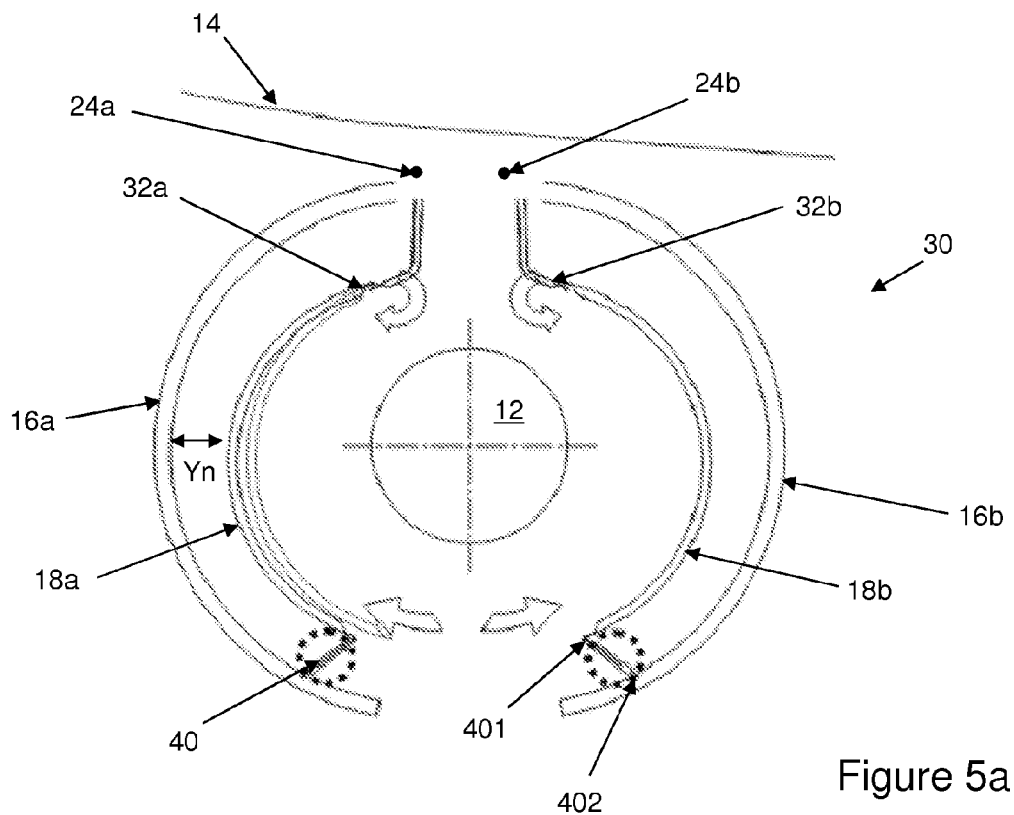
FIG. 5a illustrates a third opening step for the nacelle of FIG. 3a in which the inner cowl doors are opened independently of the outer cowl doors.

Referring next to FIG. 5a, illustrating a third step in the opening sequence, the core cowl doors 18a, 18b are manually rotated outwardly, either independently or simultaneously, towards the stationary thrust-reverser cowl doors 16a, 16b, about the core cowl hinge lines 32a, 32b. This rotation of the core cowl doors 18a, 18b relative to the thrust-reverser cowl doors 16a, 16b causes the link rods to compress, i.e. to reduce in length.

Figure 5B:
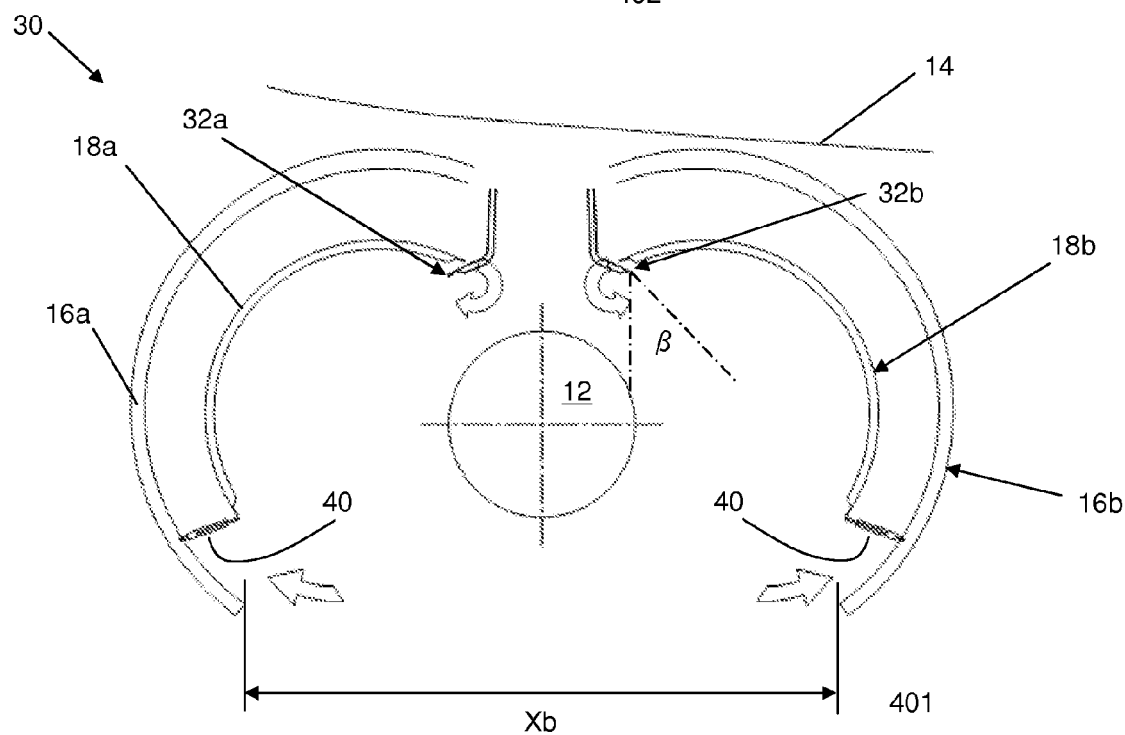
FIG. 5b illustrates a fourth opening step for the nacelle of FIG. 3a in which the inner and outer cowls are rotated simultaneously to a fully open position.

Since the core cowl hinge lines 32a, 32b are radially inwardly offset from the thrust-reverser hinge lines 24a, 24b, and since the core cowl doors 18a, 18b have a reduced radius compared to the thrust-reverser cowl doors 16a, 18b, the core cowl doors 18a, 18b are able to rotate through a greater angle than the thrust-reverser cowl doors 16a, 16b and to "nest" within the cavity defined therein as shown in FIG. 5b.

The maintenance operator continues to rotate the core cowl doors 18a, 18b towards the thrust-reverser cowl doors 16a, 16b until the link rods 40 are fully compressed and the "nested" condition of the core cowl and thrust-reverser doors has been achieved. It will be appreciated that, in this nested position, the spacing or perpendicular distance Yn between the core cowl door and the corresponding thrust reverser door is less than that Ys at the fully closed position shown in FIG. 3a. This position is hereafter termed the "intermediate position". The link rods 40 are then locked in the fully contracted condition to prevent further variations in length.

In a fourth step in the opening sequence, illustrated in FIG. 5b, the maintenance operator uses the PDOS system to rotate the thrust-reverser cowl doors 16a, 16b to the fully open position. During this step, the thrust-reverser cowl doors 16a, 16b and the corresponding core cowl doors 18a, 18b are rotated simultaneously, being connected by means of the link rods 40.

Once in the fully open position, the thrust-reverser cowl doors and core cowl doors are maintained in the open position by further supports, known as "hold open rods" (not shown), which are provided as a safety feature in the event of failure of the PDOS system.

The articulations at the connection points between each link rod and the respective core cowl door 18a, 18b and thrust-reverser cowl door 16a, 16b, enable the doors to rotate simultaneously about different hinge lines whilst being connected by a fixed-length rod. Where the thrust-reverser cowl hinge lines 24a, 24b and the core cowl hinge lines 32a, 32b are not parallel, the articulations allow for any movement of the attachment points forward or aft relative to each other.

FIG. 5b shows the thrust-reverser cowl doors 16a, 16b in their fully open position with the core cowl doors 18a, 18b nested therein. It will be appreciated that, while the angle of rotation $\alpha$ of the thrust-reverser cowl doors 16a, 16b is no different to that of the known nacelle 10, the angle of rotation $\beta$ of the core cowl doors 18a, 18b is increased, thereby increasing the available access Xb to the engine core compared with the nacelle 10.

Figure 6:
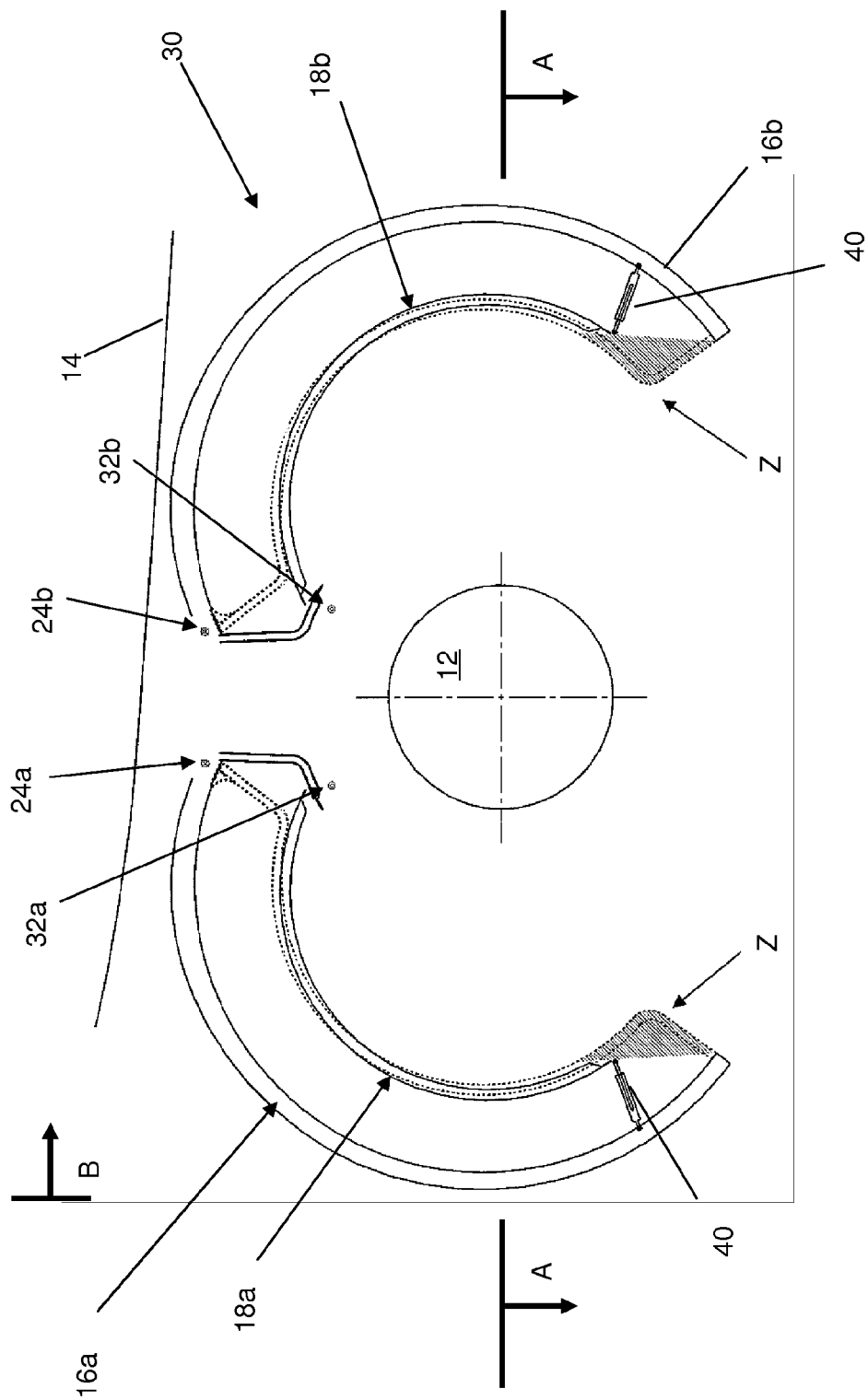
FIG. 6 shows a comparison between the nacelle of FIG. 1 and the nacelle of FIG. 3a in the fully open position.
Figure 7:
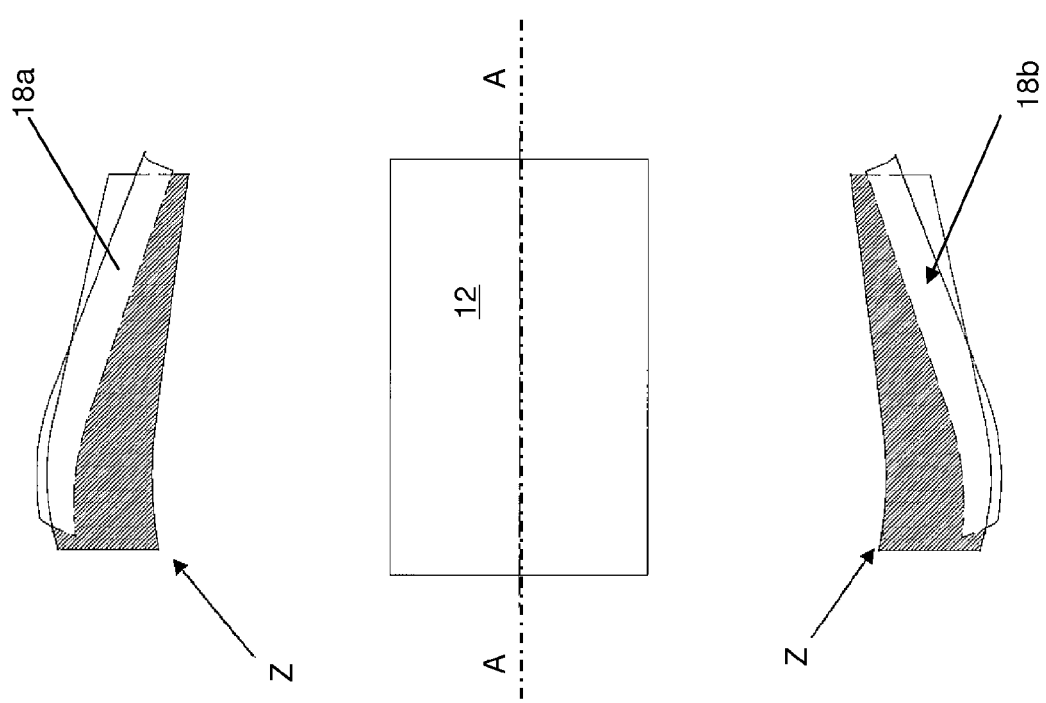
FIG. 7 shows a view of the section A-A in FIG. 6.
Figure 8:
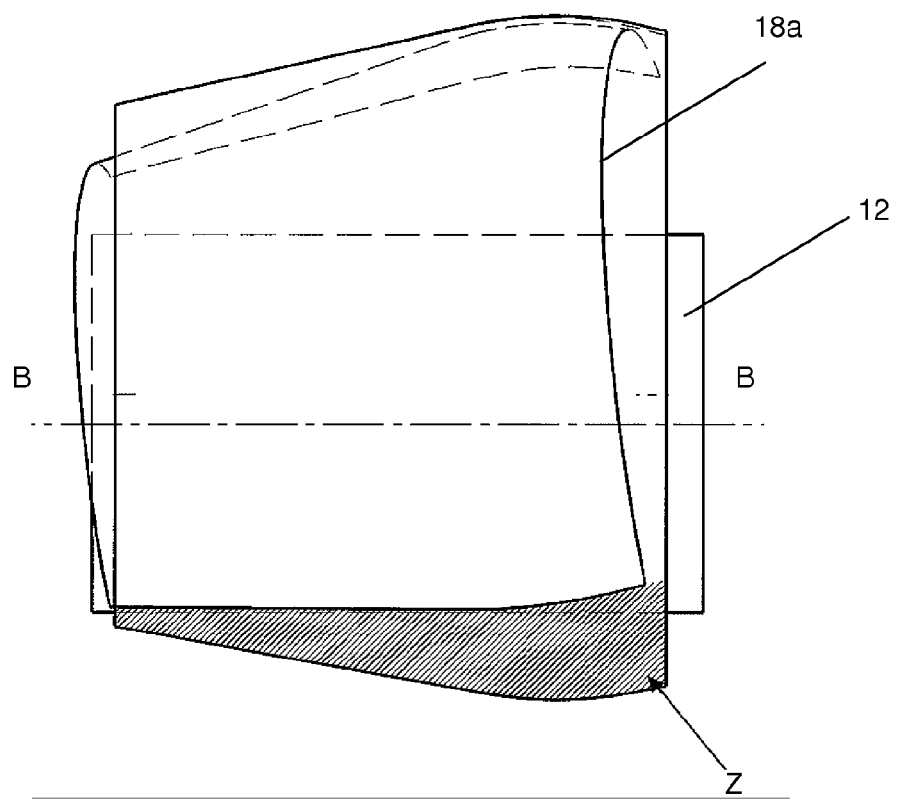
FIG. 8 shows a view of the section B-B in FIG. 6.

This increase in access is illustrated in FIGS. 6 to 8. FIG. 6 shows an overlay of a section through the thrust-reverser section of the known nacelle 10 and the nacelle 30 of the present invention in their open condition. It can be seen that the core cowl doors 18a, 18b of the nacelle according to the present invention are able to rotate through a considerably greater angle ($\beta$) than in the case of the known nacelle 10 ($\alpha$). For example, the core cowl doors 18a, 18b of the nacelle 30 may be rotatable through an angle $\beta$ of up to 58° compared with an angle $\alpha$ of less than 36° in the case of the known nacelle 10.

The shaded area Z represents the reduced accessibility available to maintenance personnel with the conventional C-Duct type thrust-reverser nacelle 10 when compared to the nacelle 30 of the present invention. The increased accessibility to the engine core provided by the present invention is extremely beneficial to the maintenance operator and can significantly reduce maintenance time on the engine.

FIG. 7 shows a view of the section A-A in FIG. 6 while FIG. 8 shows a view of the section B-B. These Figures clearly show the improved access afforded by the present invention, represented by the shaded area Z, in comparison to the conventional C-Duct type thrust-reverser nacelle 10.

FIGS. 9 and 10 illustrate the closing procedure for the cowl doors 16a, 16b, 18a, 18b of the thrust-reverser section of the nacelle 30, which is the substantially the reverse of the opening sequence. For completeness, however, the steps are briefly outlined below.

Figure 9A:
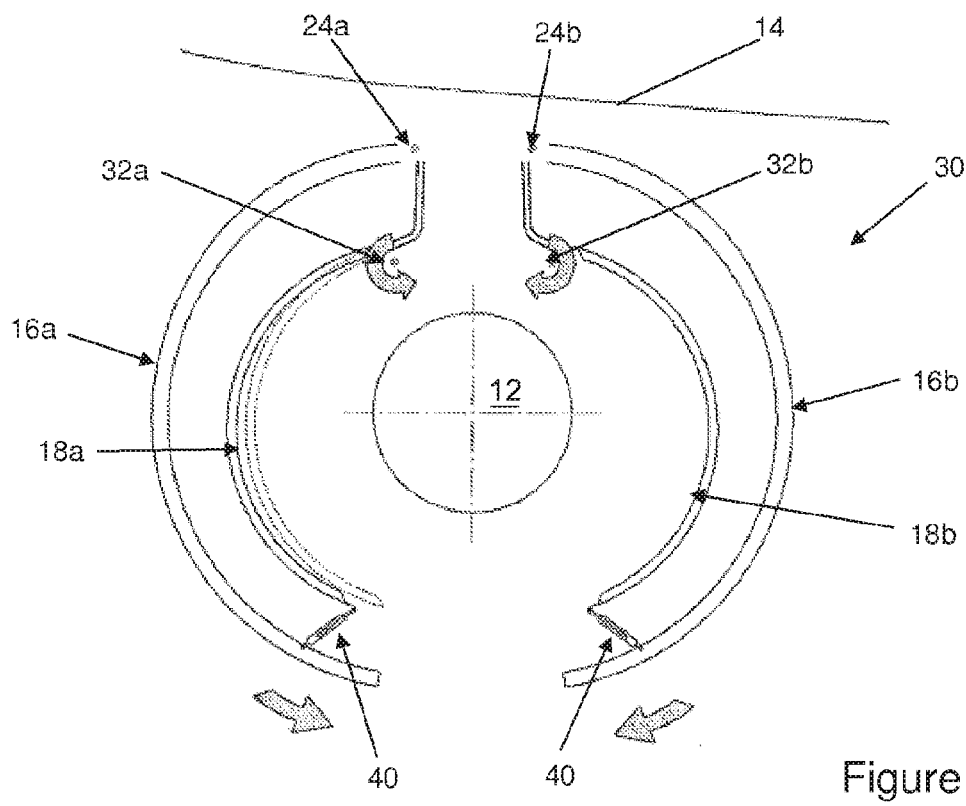
FIG. 9a illustrates a first closing step for the nacelle of FIG. 3a in which the inner and outer cowl doors are rotated simultaneously towards a partially open position.

In a first closing step, shown in FIG. 9a, the maintenance operator unlocks and detaches the or each hold open rod and activates the PDOS system to lower the cowl door pairs 16a, 18a, 16b, 18b until the intermediate position is reached in which the thrust-reverser cowl doors 16a, 16b are almost closed but still provide sufficient access to the core cowl doors 18a, 18b for latching purposes.

Figure 9B:
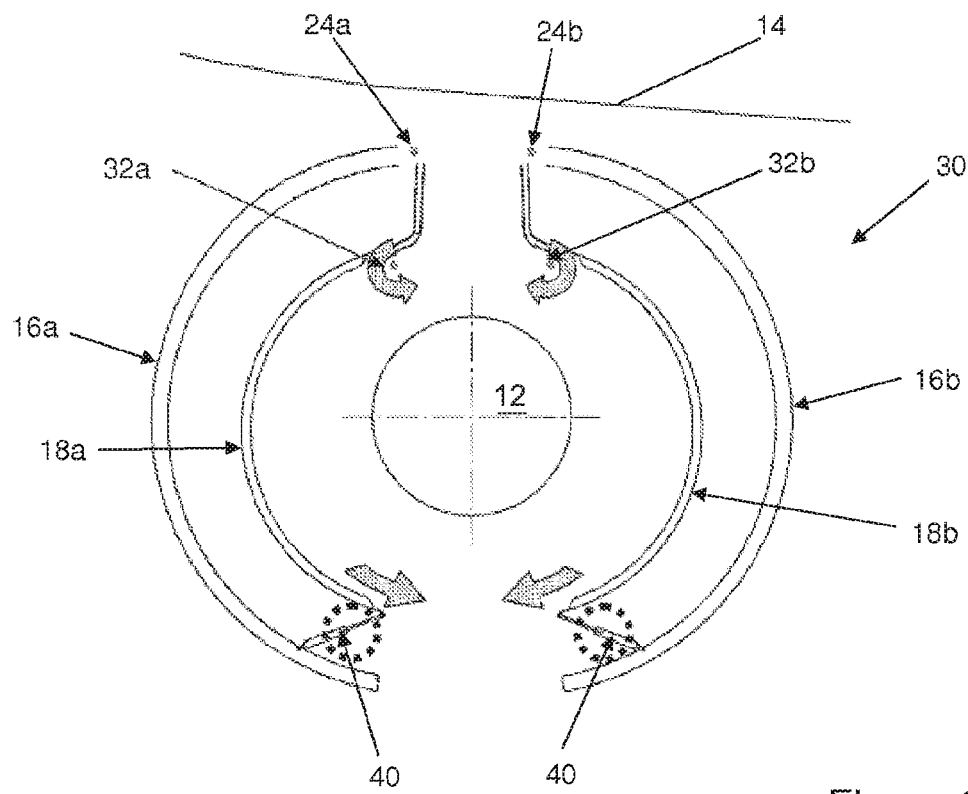
FIG. 9b illustrates a second closing step for the nacelle of FIG. 3a in which the inner cowl door are closed independently of the outer cowl doors.

In a second closing step, shown in FIG. 9b, the link rods 40 are unlocked, allowing them to extend as the core cowl doors 18a, 18b are rotated from their nested position within the thrust reverser cowl doors 16a, 16b to the closed position with the thrust-reverser cowl doors 16a, 16b held stationary by the PDOS system.

Figure 10A:
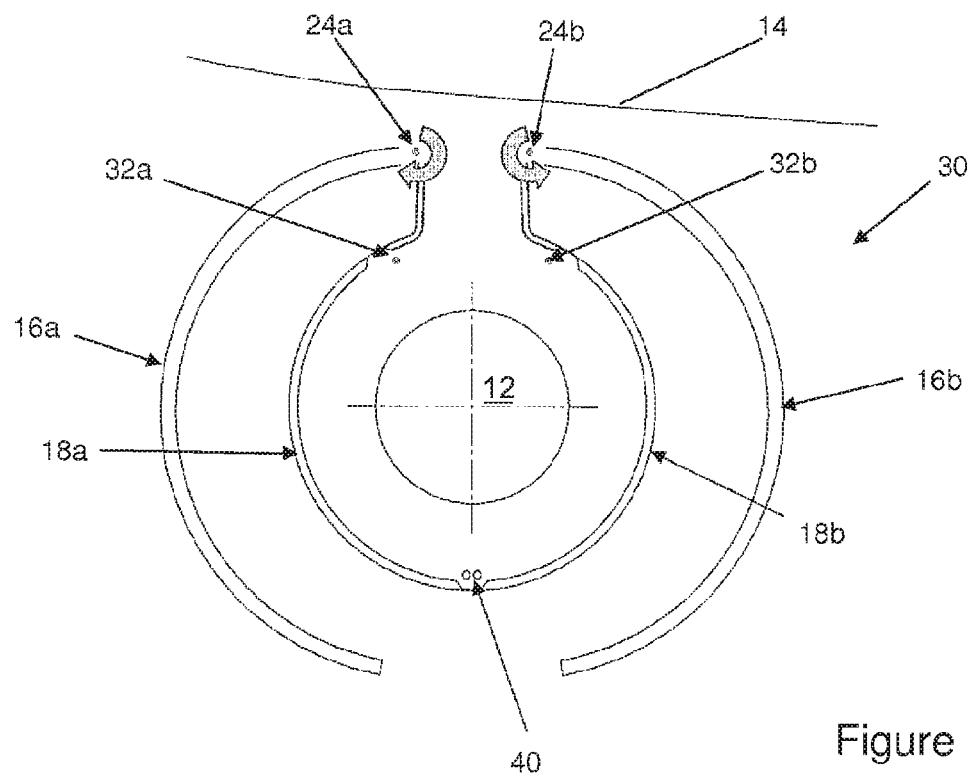
FIG. 10a illustrates a third closing step for the nacelle of FIG. 3a in which the connecting devices are detached from the outer cowl doors and stowed.

In a third closing step, shown in FIG. 10a, the link rods 40 are detached at their second ends 402 from the attachment points on the inner surface of the thrust-reverser cowl doors 16a, 16b and are returned to their stowed position within the core cowl 18a, 18b. The core cowl doors 18a, 18b are then fully closed and coupled or locked together at their lower interface 34 by means of the second latch. Advantageously, the design is such that if the link rods 40 are not correctly located in the stowed position, they will protrude through the split line between the core cowl doors 18a, 18b which will therefore not fully close.

Figure 10B:
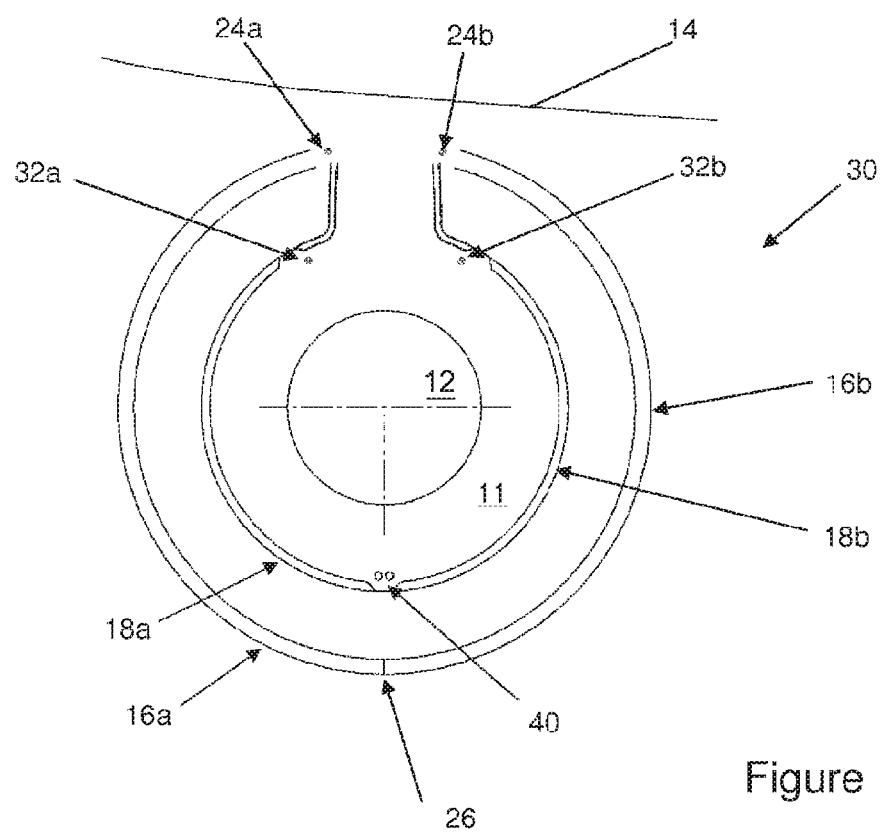
FIG. 10b illustrates a fourth closing step for the nacelle of FIG. 3a in which the outer cowl doors are closed whilst the inner cowl doors remain stationary.

The final closing step, illustrated in FIG. 10b, involves the maintenance operator closing the thrust-reverser cowl doors 16a, 16b by means of the PDOS system and locking them together at their lower interface 26 by means of latching, such as by the first latch.

The precise form of link rod 40 and attachment means/attachment point for coupling the second end 402 thereof to the thrust-reverser cowl doors 16a, 16b is not essential and the skilled person will be eminently familiar with devices and configurations suitable to achieve the advantageous functionality described herein.

For example, in one embodiment, each link rod 40 comprises an elongated cylinder within which a cylindrical rod is slidably disposed. The free end of the cylindrical rod, constituting the first end 401 of the link rod 40, is coupled to the inner surface of the respective core cowl door 18a, 18b by means of the aforementioned articulation, whilst the free end of the cylinder, constituting the second end 402 of the link rod 40, is provided with a suitable attachment means for releasably engaging with the attachment point provided on the corresponding thrust-reverser cowl door 16a, 16b.

The link rod 40 may be biased towards the fully extended or the fully retracted position, as desired. This biasing force may be provided by resilient biasing means such as a spring. In one embodiment, a gas strut or compression strut is used for each link rod 40. Alternatively, or in addition, the length of the link rod 40 may be controlled by an actuator such as a hydraulic or pneumatic piston or an electric motor. Where the link rod 40 is power actuated, deployment and stowage thereof may also be controlled by actuators. Such an arrangement advantageously permits the control of the thrust-reverser opening and closing operations from a remote location, improving operational efficiency and safety.

As described above, the link rods 40 may be provided with latching or locking means (not shown), arranged to operate either manually or automatically at a pre-determined point or points along the stroke of the link rod 40, to maintain the link rod 40 at a predetermined length.

In the embodiment described above, the link rod 40 is able to be locked in its fully retracted condition so as to hold the core cowl doors 18a, 18b in the nested condition. Alternatively, or in addition, each link rod 40 may be lockable in both the fully retracted and fully extended conditions, and/or in various intermediate-length conditions.

It is noted that in some instances, for example where biasing means such as a spring or other biasing device is provided to bias the link rods 40 towards the fully retracted condition, such locking means may be unnecessary since the core cowl doors 18a, 18b will be urged towards the nested condition by the biasing force once the link rods 40 are coupled to the attachment points on the thrust-reverser cowl doors 16a, 16b.

FIG. 11 shows the movement of the left hand link rod 40 from an initial position 40a to an end position 40e during opening of the left hand thrust-reverser and core cowl doors 16a, 18a. The Figure clearly illustrates the trajectory 44t of the first end 401 of the link rod 40 (the articulation with the core cowl door 18a) and the trajectory 46t of the second end 402 of the link rod 40 (the attachment point with the thrust-reverser door 16a) during the movement of the cowl doors to the fully open position. While the trajectory 44t is perpendicular to the core cowl hinge line 32a, and the trajectory 46t is perpendicular to the thrust-reverser hinge line 24a, they are not mutually parallel such that the orientation of the link rod 40 varies during opening. This change in orientation of the link rod 40 between the intermediate position and the fully open position of the cowl doors advantageously results in the core cowl door 18a, nesting further within the thrust-reverser cowl door 16a as the doors approach the fully open position, thereby permitting even greater access to the engine core 12.

Figure 12A:
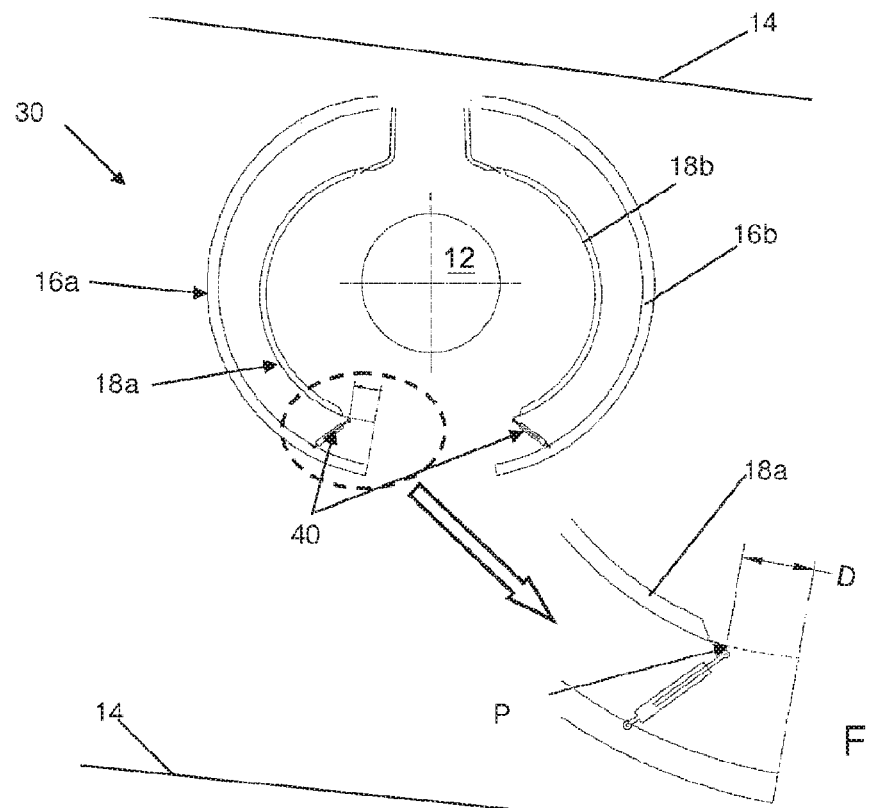
FIGS. 12a and 12b illustrate the increase in available access to the engine afforded by the relative movement between the inner and outer cowl doors during opening.
Figure 12B:
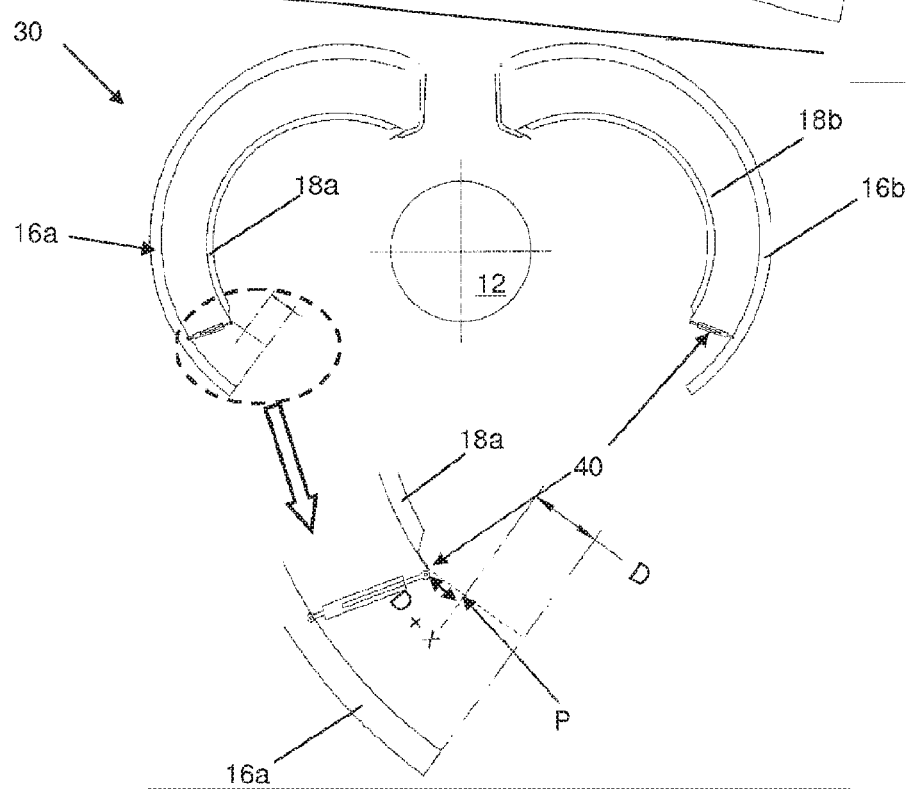

FIGS. 12a and 12b demonstrate this further increased access. FIG. 12a illustrates the cowl doors in the intermediate position, i.e. immediately after step three of the opening sequence. Reference D represents the increased access provided by the nesting of the core cowl door within the thrust-reverser door provided in comparison with the known nacelle 10 of FIG. 1.

FIG. 12b, on the other hand, illustrates the cowl doors in the fully open position, i.e. immediately after completion of the fourth step in the opening sequence. This Figure shows how a further increase in access (D+x) is provided by the change in orientation of the link rod 40 as the cowl doors move towards the fully open position which results in the core cowl door 18a nesting further within the thrust-reverser cowl door 16a. It will be appreciated that the right hand arrangement of cowl doors operates similarly.

It will be recognised by those skilled in the art that, when coupled by the respective link rod 40, the thrust-reverser cowl door 16a and the core cowl door 18a effectively form a four-bar linkage, with the two cowl doors 16a, 18a, the upper bifurcation 20a and the link rod 40 together forming the bars of the linkage and the thrust-reverser hinge 24a, the core cowl hinge 32a and the articulations at each end 401, 402 of the link rod 40 together forming the pivots of the linkage. This enables rotation of the core cowl door 18a relative to the thrust-reverser cowl door 16a even during final step of the opening sequence, i.e. as the cowl doors approach the fully open position, and contrasts with the known thrust-reverser arrangement of FIG. 1 in which the core cowl door 18a and the thrust-reverser door 16a are integral or permanently joined and thus rotate as a unitary member at all times during opening.

Various modifications may be provided to the invention, the embodiments of which above are to be considered as illustrative and not restrictive. That is to say, the invention is not limited to the specific embodiments provided, but only by the scope of the claims and statements of invention provided herein.

For example, while in the above embodiment each link rod 40 is permanently attached to the respective core cowl door 18a, 18b by means of the articulation, it is possible for the link rod 40 to be permanently attached to the respective thrust-reverser cowl door 16a, 16b. In this arrangement, the second step of the opening sequence would involve the maintenance operator releasing the second end of the link rod 40 from the thrust-reverser cowl door 16a, 16b and connecting it to a suitable attachment point provided on the core cowl door 18a, 18b.

On the other hand, it is envisaged that neither of the link rods 40 may be permanently connected to the cowl doors but may be fully detachable for storage elsewhere on the engine or nacelle. In this case, both ends 401, 402 of the link rod 40 may be provided with connection means for connection in an articulated manner to suitable attachment points on the thrust-reverser and core cowl doors 16a, 16b, 18a, 18b.

It will be appreciated that the present invention provides an advantageous improvement to a thrust-reverser section of a nacelle for a turbine engine. By providing independently pivotable inner and outer cowl doors in the thrust-reverser section of the nacelle, and by providing an articulated linkage between them, improved access to the engine core can be achieved.

Other advantages will be apparent to one skilled in the art. For example, nacelle maintainability is increased by improving accessibility to the engine even in cases where the opening angle α of the thrust-reverser cowl doors 16a, 16b is restricted by the proximity of the nacelle to the wing.

The invention may reduce nacelle weight by removal of the lower bifurcations 22a, 22b typical of a conventional C-duct type design, thereby also reducing the amount of "lost" bypass flow area. In addition, the invention removes the need for a separate opening system (PDOS) for the core cowl doors 18a, 18, which would otherwise be required for an independently hinged core cowl design.

In addition, the articulated nature of the linkage formed by the cowl doors and the link rods is such that if the PDOS is erroneously used to close the thrust-reverser cowl doors 16a, 16b without detachment of the link rod 40 during the third step of the closing sequence, no structural damage will occur since the thrust-reverser cowl doors 16a, 16b will be completely closed before the core cowl doors 18a, 18b are completely closed.

While the embodiments provided above relate to the thrust-reverser section of a nacelle for a turbine engine, it will be appreciated by one skilled in the art that the invention is equally applicable to other sections of the nacelle, for example outer cowl and core cowl doors that are forward of the thrust-reverser section. Furthermore, it is envisaged that there are potentially other uses for the present invention with other engine types and for other vehicle applications.

The invention claimed is:

1. A nacelle for an engine, comprising:
   an outer cowl door pivotally rotatable about a first hinge line;
   an inner cowl door pivotally rotatable about a second hinge line, the second hinge line being positioned radially inwardly of the first hinge line; and
   a connector selectively connecting the outer and inner cowl doors together, wherein when connecting the outer and inner cowl doors together, the connector causes the outer cowl door and inner cowl door to rotate simultaneously about their respective first and second hinge lines,
   wherein a first perpendicular distance is defined between the outer cowl door and the inner cowl door when in a closed position, and
   wherein a second perpendicular distance is defined between the outer cowl door and the inner cowl door when in the fully opened position, the second perpendicular distance being less than the first perpendicular distance.

2. A nacelle as claimed in claim 1, wherein the outer and inner cowl doors are hinged to the nacelle for independent rotation relative thereto.

3. A nacelle as claimed in claim 1, wherein the first and second hinge lines are offset from each other.

4. A nacelle as claimed in claim 3, wherein the first hinge line is substantially parallel to the second hinge line.

5. A nacelle as claimed in claim 3, wherein the first and second hinge lines are substantially parallel to a central axis of the nacelle.

6. A nacelle as claimed in claim 1, wherein:
   in the closed position the connector does not connect the inner and outer cowl doors together; and
   in the fully open position the connector connects the inner and outer cowl doors.

7. A nacelle as claimed in claim 1, wherein the outer and inner cowl doors are rotatable between closed and fully open positions and wherein the angle of rotation of the inner cowl door between the closed and fully open positions thereof is greater than the angle of rotation of the outer cowl doors between the closed and fully open positions thereof.

8. A nacelle as claimed in claim 6, wherein in the fully open position of the outer and inner cowl doors, the inner cowl door is at least partially nested within the outer cowl door.

9. A nacelle as claimed in claim 6, wherein the connector is arranged to maintain the second perpendicular distance less than the first perpendicular distance when the cowl doors are in the fully open position.

10. A nacelle as claimed in claim 1, wherein a first end of the connector is connectable to one of the inner and outer cowl doors by means of a first articulation and wherein a second end of the connector is connectable to the other of the inner and outer cowl doors by means of a second articulation.

11. A nacelle as claimed in claim 10, wherein the first end of the connector is fixed to one of the inner and outer cowl doors by means of the first articulation, and wherein the second end of the connector is detachably connectable to the other of the inner and outer cowl doors by means of an articulated attachment.

12. A nacelle as claimed in claim 10, wherein the first and/or second articulation comprises one of a ball joint, rose joint or universal joint.

13. A nacelle as claimed in claim 1, wherein when the connector connects the inner and outer cowl doors, the arrangement substantially defines an articulated, four-bar linkage comprising the cowl doors, the connector and a portion of the nacelle.

14. A nacelle as claimed in claim 1, wherein the inner cowl door comprises a portion of a core cowl for at least partially surrounding a core of an engine housed in the nacelle.

15. A nacelle as claimed in claim 1, wherein the outer cowl door comprises a thrust-reverser portion of the nacelle.

16. A nacelle as claimed in claim 1, wherein the connector is movable between a stowed position and a deployed position in which the connector connects the outer and inner cowl doors.

17. A nacelle as claimed in claim 1, wherein the connector has a variable-length.

18. A nacelle as claimed in claim 17, wherein the connector is extensible and movable between a first, reduced length, position and a second, extended length, position.

19. A nacelle as claimed in claim 18, wherein the connector is arranged to connect the inner cowl door to the outer cowl door such that movement of the connector between the second position and the first position permits the inner cowl door to rotate relative to the outer cowl door such that a perpendicular distance between the cowl doors reduces.

20. A nacelle as claimed in claim 18, wherein the connector is lockable in at least one of the first and second positions.

21. A nacelle as claimed in claim 20, wherein the connector is lockable in a position between the first and second positions.

22. A nacelle as claimed in claim 18, wherein the connector is biased towards one of the first and second positions.

23. A nacelle as claimed in claim 1, wherein:
the outer cowl door comprises an upper edge and a lower edge, the first hinge line being in proximity to the upper edge of the outer cowl door; and
the inner cowl door comprises an upper edge and a lower edge, the second hinge line being in proximity to the upper edge of the inner cowl door,
wherein the connector connects the outer cowl door to the inner cowl door in proximity to their respective lower edges.

24. A nacelle as claimed in claim 23, wherein the connector is pivotally connectable to respective lower edges of the outer cowl door and the inner cowl door.

25. A method of accessing an engine housed in a nacelle having outer and inner cowl doors, the method comprising:
partially opening at least one outer cowl door through rotation about a first hinge line;
connecting the at least one outer cowl door to the at least one inner cowl door;
while connected, rotating the at least one inner cowl door about a second hinge line while the at least one outer cowl door is stationary; and
rotating the outer cowl door and the inner cowl door simultaneously about their respective first and second hinge lines,
wherein a first perpendicular distance is defined between the outer cowl door and the inner cowl door when in a closed position, and
wherein a second perpendicular distance is defined between the outer cowl door and the inner cowl door when in the fully opened position, the second perpendicular distance being less than the first perpendicular distance.

26. A method as claimed in claim 25, further comprising opening the at least one outer cowl door by rotation through a first angle of rotation and opening the at least one inner cowl door by rotation through a second angle of rotation that is greater than the first angle of rotation.

27. A method as claimed in claim 25, comprising carrying out the opening and connecting steps simultaneously.

28. A method as claimed in claim 25, wherein opening the at least one outer cowl door comprises rotating the at least one outer cowl door about the first hinge line and wherein opening the at least one inner cowl door comprises rotating the at least one inner cowl door about the second hinge line, the first and second hinge lines being offset from each other.

29. A method as claimed in claim 25, comprising:
unlatching the outer cowl door and rotating it through a first angle to a partially open position;
unlatching the inner cowl door and coupling a connector between the inner cowl door and the outer cowl door;
opening the inner cowl door by rotation through a second angle that is greater than the first angle; and
rotating the outer cowl door to a fully open position whereby the connector couples the movement of the outer cowl door with the inner cowl door, causing the cowl doors to open simultaneously.

30. A nacelle for an engine, comprising:
an outer cowl door;
an inner cowl door; and
a variable-length connector selectively connecting the outer and inner cowl doors together,
wherein the connector is arranged to connect the inner cowl door to the outer cowl door such that movement of the connector between a lengthened position and a reduced-length position permits the inner cowl door to rotate relative to the outer cowl door such that a perpendicular distance between the cowl doors reduces,
wherein a first perpendicular distance is defined between the outer cowl door and the inner cowl door when in a closed position, and
wherein a second perpendicular distance is defined between the outer cowl door and the inner cowl door when in the fully opened position, the second perpendicular distance being less than the first perpendicular distance.

* * * * *